Patented Dec. 24, 1946

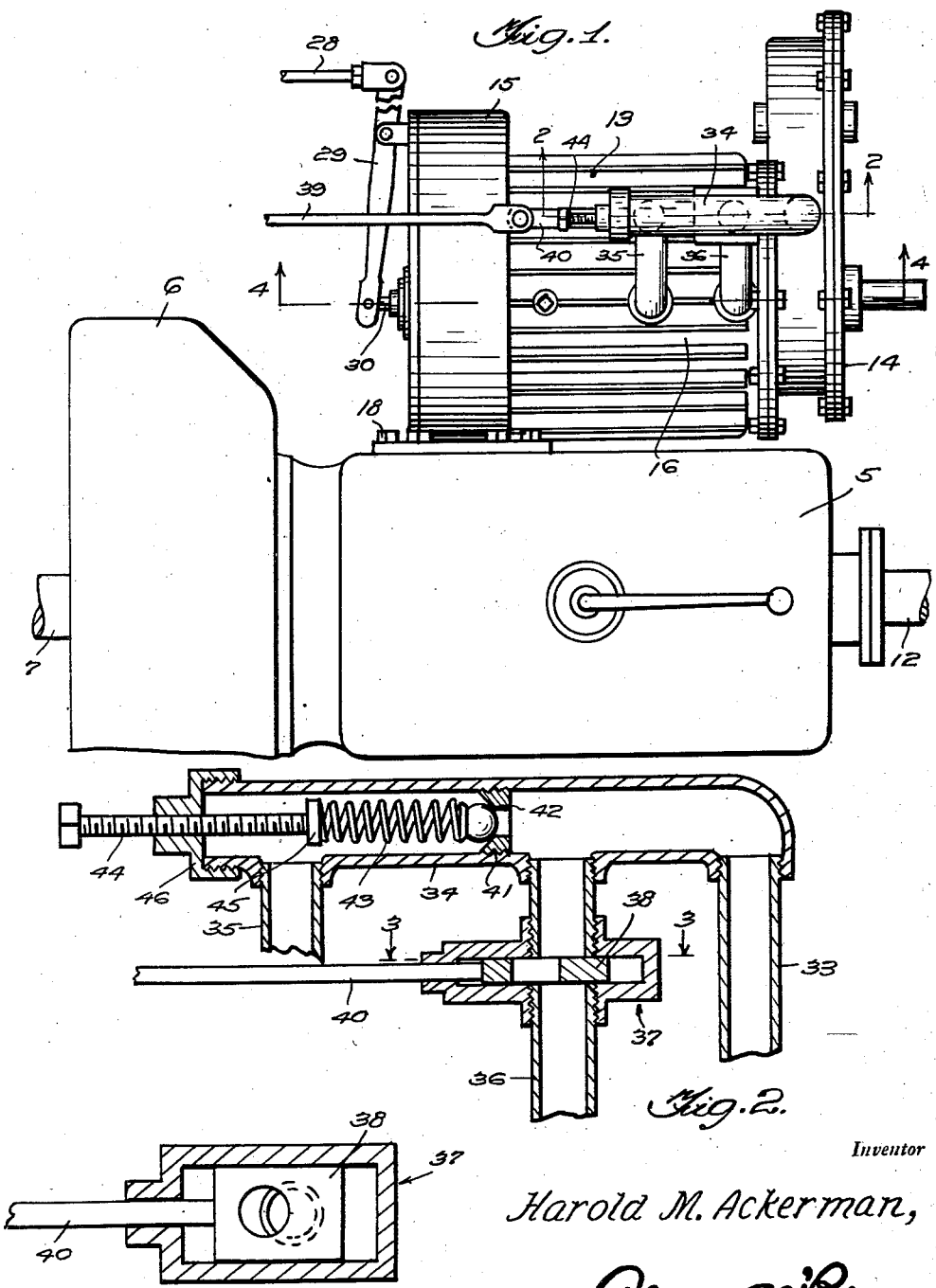

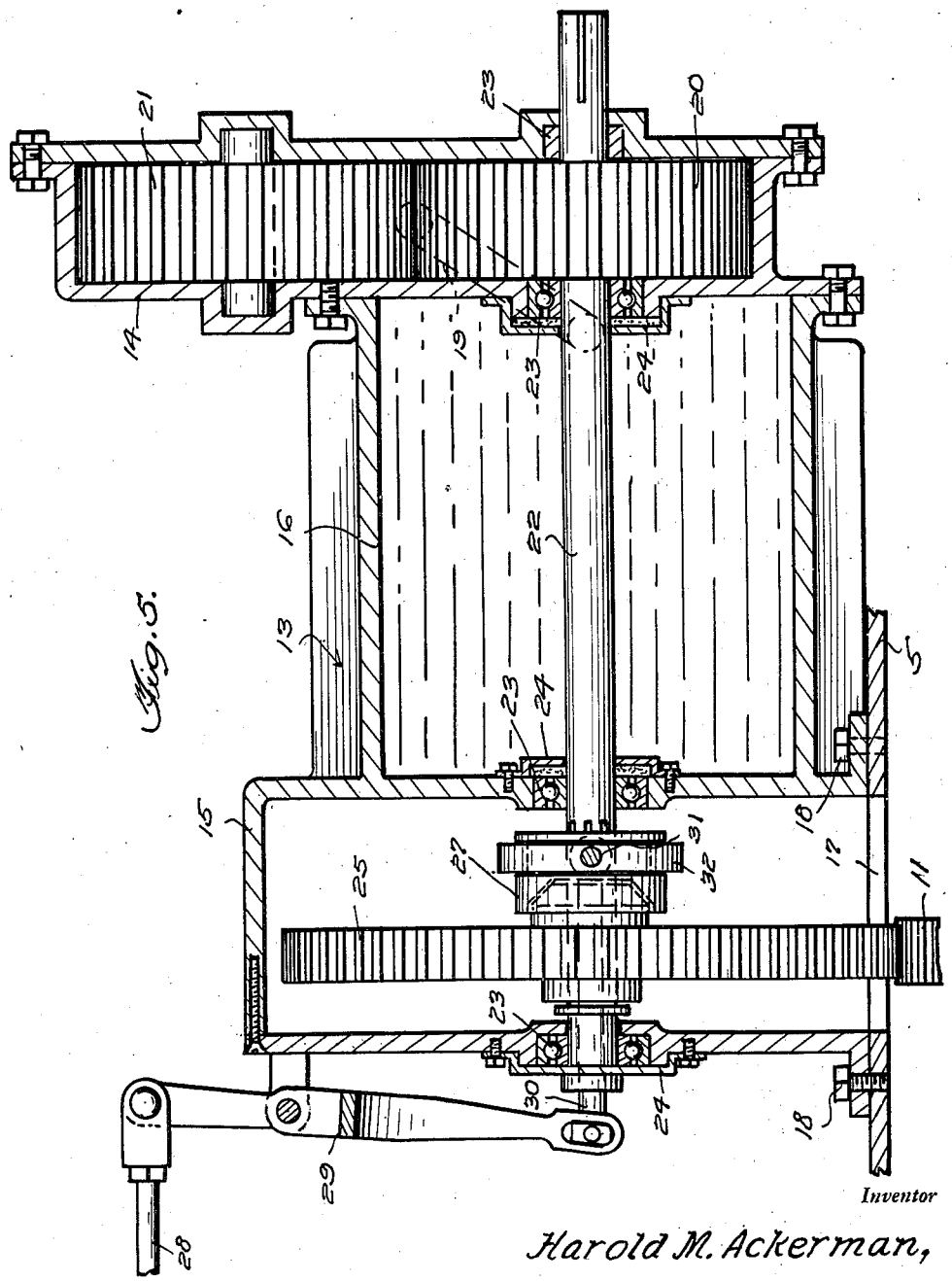

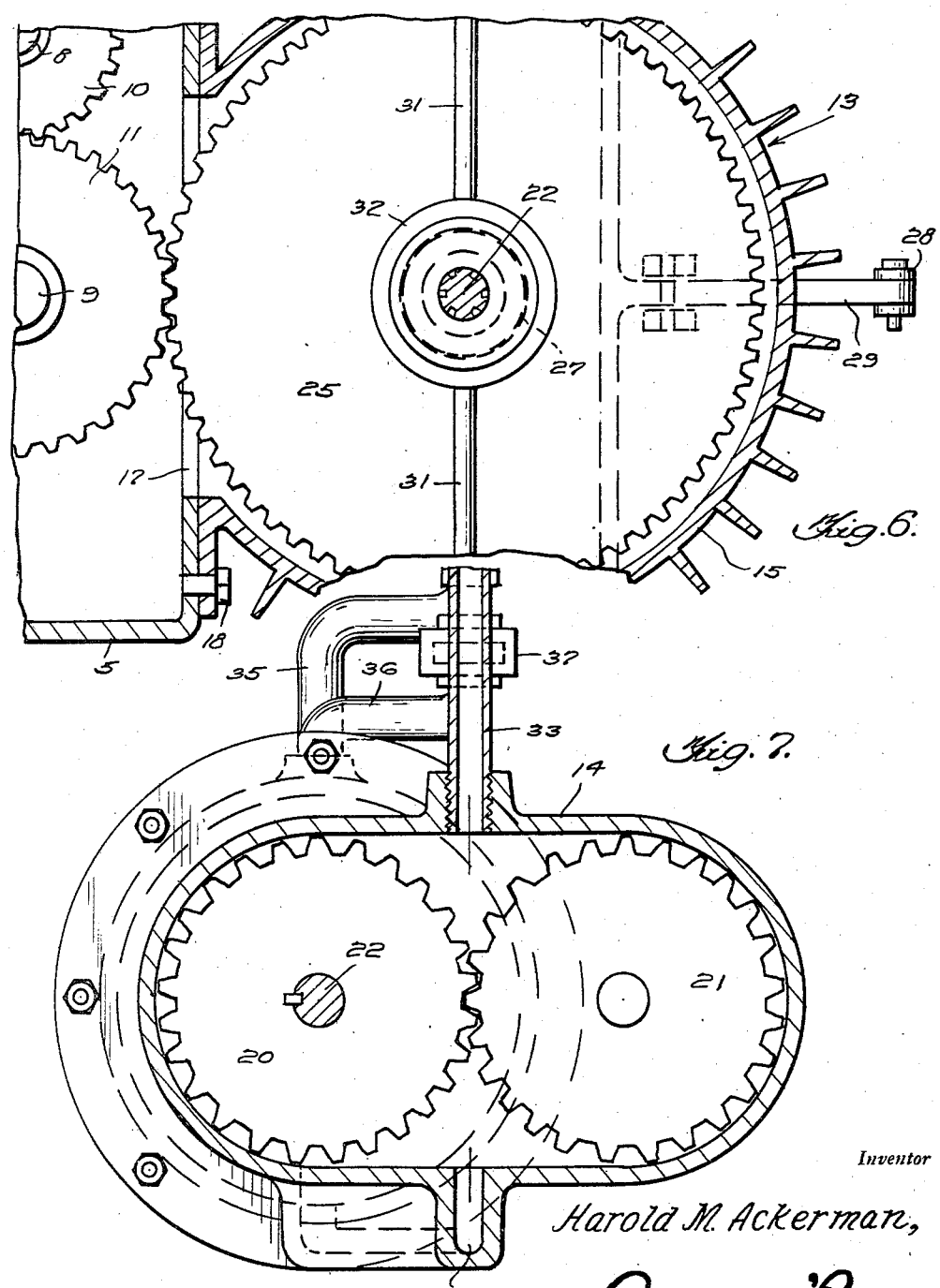

2,413,162

UNITED STATES PATENT OFFICE 2,413,162

FLUID BRAKE

Harold M. Ackerman, Ontario, Oreg., assignor of one-half to Forrest L. Cozad, Ontario, Oreg.

Application November 15, 1945, Serial No. 628,836

5 Claims. (Cl. 188—92)

This invention relates to a fluid brake for motor vehicles, and has more particular reference to an improved device of this character wherein the propeller shaft of the vehicle is subjected to fluid resistance for braking the vehicle.

An object of the invention is to provide a device of the above kind embodying a gear pump driven from a cluster gear of the motor vehicle transmission, employing a fluid other than the lubricant in the transmission case for braking the vehicle, and including a throttle valve which may be operated at will for varying the fluid resistance and braking the vehicle accordingly.

A further object of the invention is to provide a construction including a housing bolted to a side of the transmission case of the vehicle and including a pump chamber, a fluid reservoir and a gear chamber, the gear chamber containing a gear for driving the drive shaft of the pump and which projects through the side of the transmission case and meshes with a cluster gear of the transmission for being driven by the latter.

A still further object of the invention is to provide a construction of the above kind wherein a grease retainer is provided between the fluid reservoir and the gear chamber to prevent passage of the lubricant from the transmission case and gear chamber into the fluid reservoir, manually operable clutch means being provided between the gear of the gear chamber and the drive shaft of the pump so as to throw the latter into or out of operation at will.

Yet another object is to provide an arrangement wherein the fluid will be trapped to act upon the propeller shaft, and wherein a safety valve is employed for releasing the trapped fluid at a predetermined pressure.

Other objects and features of the invention will become apparent from the following description when considered in connection with the accompanying drawings, in which:

Figure 1 is a fragmentary top plan view showing a conventional type of motor vehicle transmission case and associated parts with my improved brake applied thereto.

Figure 2 is an enlarged fragmentary vertical section taken on line 2—2 of Figure 1.

Figure 3 is a fragmentary section taken on line 3—3 of Figure 2.

Figure 5 is a longitudinal section taken on line 5—5 of Figure 4.

Figure 6 is a fragmentary transverse section taken on line 6—6 of Figure 4.

Figure 7 is a fragmentary transverse section taken on line 7—7 of Figure 4.

Figure 4:
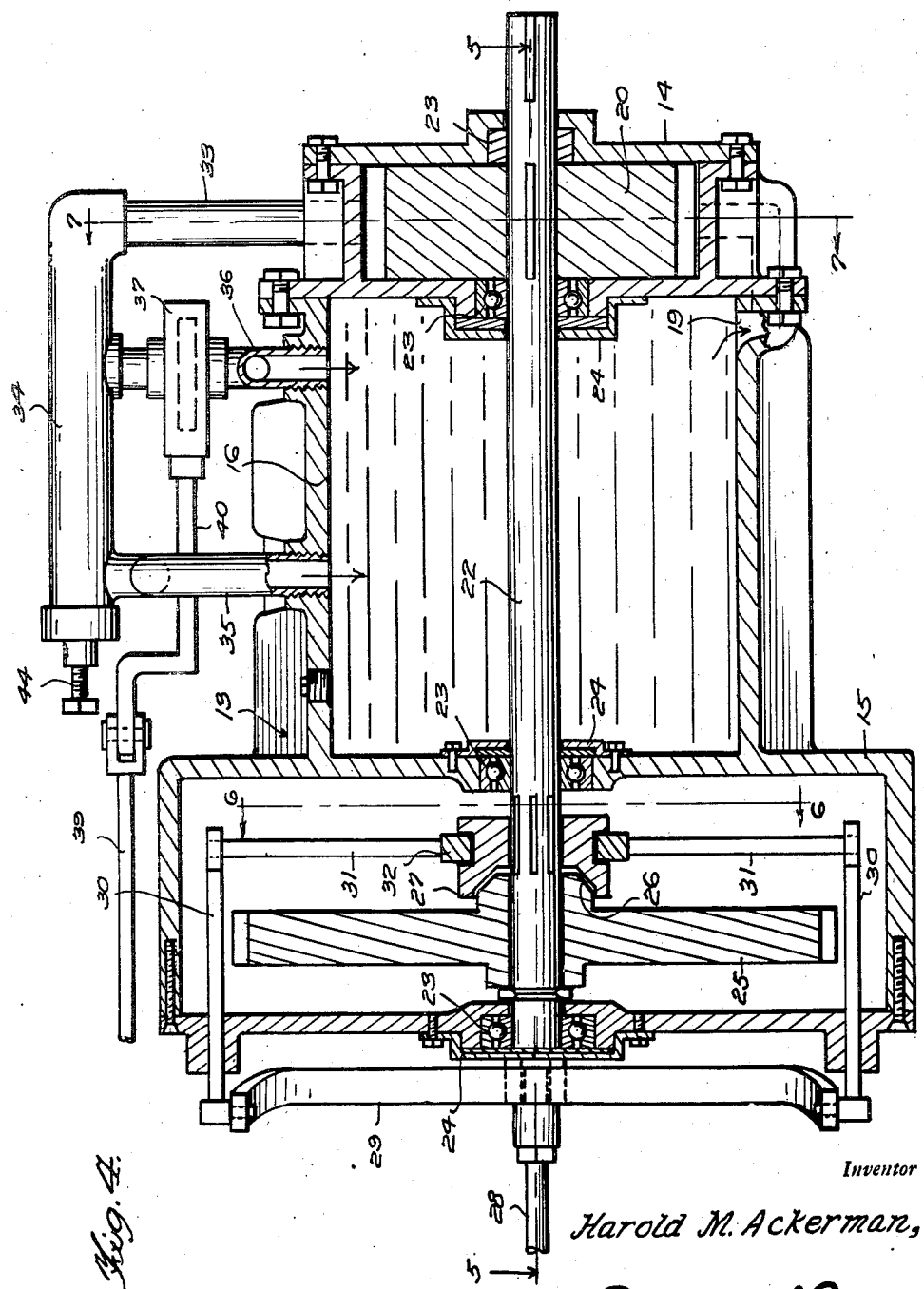
Figure 4 is an enlarged fragmentary longitudinal section taken on line 4—4 of Figure 1.

Referring in detail to the drawings, the present fluid brake is employed in connection with a conventional type of motor vehicle transmission including a transmission case 5 having a forward portion 6 within which is housed the usual foot operated or released clutch used to connect or disconnect the drive shaft 7 to or from the main transmission shaft 8. Parallel to the shaft 8 is arranged the usual countershaft 9, and mounted upon the shafts 8 and 9 are the usual coacting speed gears, two of which are indicated at 10 and 11 in Figures 5 and 6. These gears are utilized in a well known way to drive the propeller shaft 12 at the desired one of a number of different speeds, and the gears on the countershaft 9 are commonly known as cluster gears.

The present invention includes a housing 13 that provides the casing 14 of a gear pump at one end, a gear chamber 15 at the other end, and a fluid reservoir 16 intermediate the casing 14 and chamber 15. The chamber 15 is open at one side, and a slot 17 is provided in one side of the transmission case 5, the housing 13 being bolted to the side of the transmission case 5 as at 18 so that the open side of the chamber 15 is registered with the slot 17, for a purpose which will presently become apparent. The housing 13 is formed to provide an intake passage 19 which leads from the reservoir 16 to the pump case 14. Journalled in the pump case 14 are coacting pump gears 20 and 21, the gear 20 being keyed on a shaft 22 extending through the reservoir 16 and gear chamber 15 and journalled in suitable bearings 23 provided in the walls of the housing 13. Suitable grease retainers 24 are provided to prevent flow of grease or fluid about the shaft 22 between the pump chamber and the reservoir, between the reservoir and the gear chamber 15, or out of the gear chamber 15 to the exterior of the housing 13. Journalled on the shaft 22 within the chamber 15 is a gear 25 that projects through the open side of the chamber 15 and the slot 17 of transmission case 5 and meshes with the adjacent cluster gear 11 of the transmission. The hub of gear 25 carries a clutch element 26 which coacts with a further clutch element 27 slidably keyed on the shaft 22. The elements 26 and 27 provide a clutch which may be utilized to throw the pump into or out of operation by clutching gear 25 to shaft 22 or unclutching the same therefrom. Clutch element 27 may be suitably manually operated from the driver's seat of the motor vehicle by means including an operating rod 28 connected to a pivoted forked lever 29 carried by the front end of casing 13 and having its furcations connected to links 30 which are in turn connected to radial arms 31 of a collar 32 journalled on the clutch element 27. It will be noted that the intake passage 19 opens into the pump chamber at one side of the pump gears in a plane coincident with the point of contact of said gears. Consequently, when the shaft 22 is driven from the cluster gear of the transmission, the gear 20 will be rotated to simultaneously rotate the gear 21, causing these gears to create a suction within the pump chamber which draws the fluid from the reservoir 16 through the passage 19 and into said pump chamber.

The outlet of pump case 14 is connected by a pipe 33 to one end of a manifold 34 whose other end is connected by a pipe 35 with the reservoir 16. The intermediate portion of manifold 34 is also connected with reservoir 16 by a pipe 36 having a throttle valve 37 interposed therein. The throttle valve 37 is preferably in the form of a sliding gate valve whose movable member or gate 38 may be suitably operated from the driver's seat of the motor vehicle by means including an operating rod 39 connected to the stem 40 of said movable member or gate 38. By operating the gate 38, the outlet of pump case 14 may be brought into communication with the reservoir 16 by way of pipe 33, the adjacent end portion of manifold 34 and pipe 36. It will thus be seen that when the shaft 22 is rotated, a constant and uninterrupted flow of fluid will be maintained through the pump case 14 as long as the valve 37 is open, the fluid entering through the passage 19 and discharging through the pipe 33, manifold 34 and pipe 36 back into the reservoir 16. However, by moving the gate 38 toward its closed position, the flow of fluid from the pump chamber will be accordingly checked and the fluid will be trapped within the pump case to accordingly offer a resistance to rotation of the pump gears. As the pump gear 20 is driven from a cluster gear of the transmission, the fluid resistance will be communicated through gears of the transmission to the propeller shaft 12 of the vehicle. By bringing the resistance to bear upon the propeller shaft in this way, braking of the vehicle is effected. As will be apparent, the pressure of the fluid in the pump chamber will be increased as the valve member 38 is moved further toward closed position, a complete check upon the flow of the fluids through the pump chamber being had when the valve member 38 is completely closed. Consequently, the fluid pressure may be readily varied as the case may demand for braking the vehicle accordingly. Upon opening the valve member 38, an uninterrupted flow of the fluid may be established through the pump chamber to remove the braking effect.

In connection with the throttle valve 37, I employ a safety valve for venting the pump chamber at a predetermined maximum pressure of the fluid therein, to consequently overcome any possibility of excessive torsion on the propeller shaft. This safety valve includes a valve seat 41 within the manifold 34 at a point between the pipes 35 and 36, a movable ball or valve member 42 within the manifold 34 arranged to move into engagement with the seat 41 in a direction toward the pipes 36 and 33 so as to close communication between the manifold 34 and the pipe 35, a compression spring 43 in the manifold 34 yieldingly acting to seat and close the valve member 42, and an adjusting screw 44 operable to vary the compression of spring 43. The spring 43 is interposed between valve member 42 and an abutment 45 engaged by the inner end of screw 44, and screw 44 is adjustably threaded through a cap 46 on one end of the manifold 34. By adjusting the compression of spring 43, the amount of pressure required to open the valve member 42 may be regulated or adjusted. Thus, when the fluid in the pump chamber reaches a pressure sufficient to overcome the compression of spring 43, the valve member 42 will be moved away from its seat 41 for venting the pump chamber by permitting a flow of fluid from the pump chamber by way of pipe 33, manifold 34 and pipe 35 back into the reservoir 16. Thus, possibility of breaking of the propeller shaft due to excessive torsion thereon set up by the pressure of fluid in the pump chamber, will be overcome.

From the foregoing description, it is believed that the construction, operation and advantages of the present invention will be readily understood and appreciated by those skilled in the art. It will be seen that I have provided a particularly efficient service brake, and a construction which may be readily installed in connection with any conventional type of motor vehicle. The brake is of such nature that the vehicle may be gradually checked in its movement or brought to a standstill without any likelihood of grabbing or slipping of the brake such as is commonly experienced with the usual types of friction brakes. Efficient action is insured by the use of a braking fluid of relatively thin consistency entirely different from the less desirable lubricant of thick consistency usually employed in the transmission case of a motor vehicle. At the same time, this lubricant of the transmission case is utilized to lubricate the bearings at opposite sides of the gear chamber 15 and the parts in the latter chamber. Minor changes and modifications of the illustrated construction and embodiment may be made, such as fall within the spirit and scope of the invention as claimed.

What I claim is:

1. The combination with a motor vehicle transmission including a transmission case having an opening in one side, and speed gears in said case, of a fluid brake for the vehicle including a housing secured to the side of the transmission case and providing a pump case, a gear chamber, and a fluid reservoir between the pump case and the gear chamber and communicating with the pump case, coacting pump gears rotatable in the pump case for normally maintaining a flow of fluid from the reservoir through the pump case back to the reservoir, manually adjustable means for checking the flow of fluid from the pump case back to the reservoir, a drive shaft for one of the pump gears extending through the reservoir into the gear chamber, said gear chamber having an open side registered with the opening of the transmission case, and a driving gear carried by said drive shaft within the gear chamber and projecting through the opening of the transmission case into mesh with one of said speed gears.

2. The construction defined in claim 1, in combination with manually operable means for clutching said driving gear to and unclutching the same from said drive shaft.

3. The construction defined in claim 1, in combination with a grease retainer for preventing flow of lubricant from the transmission case into the reservoir by way of the gear chamber and about said drive shaft.

4. The construction defined in claim 1, in combination with a manifold communicating at one end with the outlet of the pump case and at the other end with the reservoir, a pipe providing communication between the intermediate portion of the manifold and the reservoir and having said checking means interposed therein, and a spring seated check valve arranged in the manifold between the second mentioned end of the latter and said pipe, said check valve being movable to open position for permitting passage of fluid from the pump case to the reservoir at a predetermined fluid pressure in the pump case.

5. The construction defined in claim 1, in combination with check valve controlled means for venting the pump case into the reservoir around said checking means at a predetermined fluid pressure in said pump case.

HAROLD M. ACKERMAN.